(12) United States Patent
Baraldi

(10) Patent No.: US 10,398,072 B2
(45) Date of Patent: Sep. 3, 2019

(54) CUTTER UNIT FOR A ROTARY TILLING MACHINE

(71) Applicant: MASCHIO GASPARDO S.P.A., Campodarsego (PD) (IT)

(72) Inventor: Paolo Baraldi, Campodarsego (IT)

(73) Assignee: MASCHIO GASPARDO S.P.A., Campodarsego (IT)

(*) Notice: Subject to any disclaimer, the term of this patent is extended or adjusted under 35 U.S.C. 154(b) by 0 days.

(21) Appl. No.: 15/551,016

(22) PCT Filed: Feb. 17, 2016

(86) PCT No.: PCT/IB2016/050854
§ 371 (c)(1),
(2) Date: Aug. 14, 2017

(87) PCT Pub. No.: WO2016/132305
PCT Pub. Date: Aug. 25, 2016

(65) Prior Publication Data
US 2018/0020606 A1    Jan. 25, 2018

(30) Foreign Application Priority Data
Feb. 17, 2015 (IT) .............................. PD2015A0042

(51) Int. Cl.
*A01B 33/14*    (2006.01)
*A01B 33/02*    (2006.01)

(52) U.S. Cl.
CPC .......... *A01B 33/142* (2013.01); *A01B 33/021* (2013.01)

(58) Field of Classification Search
CPC .......................... A01B 33/142; A01B 33/021
See application file for complete search history.

(56) References Cited

U.S. PATENT DOCUMENTS

| 766,710 A | * | 8/1904 | Lieske | E01B 11/10 |
| | | | | 238/191 |
| 1,383,761 A | * | 7/1921 | Rutishauser | A01B 33/142 |
| | | | | 172/544 |
| 2,537,527 A | * | 1/1951 | Heckert | F16B 33/002 |
| | | | | 411/107 |
| 2,802,408 A | * | 8/1957 | Seaman | A01B 33/142 |
| | | | | 172/533 |
| 2,812,701 A | * | 11/1957 | Weaver, Jr. | A01B 33/142 |
| | | | | 172/556 |

(Continued)

FOREIGN PATENT DOCUMENTS

| CA | 2409097 A1 | * | 11/2001 | ........... A01B 33/103 |
| DE | 849314 C | * | 9/1952 | ........... A01B 33/142 |

(Continued)

*Primary Examiner* — Jamie L McGowan
(74) *Attorney, Agent, or Firm* — Pearne & Gordon LLP

(57) ABSTRACT

A cutter unit for a rotating tilling machine comprises a coupling flange connected to a rotor, a first blade and a second blade that comprises a respective operating portion and a respective coupling portion. The cutter unit further comprises a housing seat for the bladed. The coupling portion of the first blade comprises an opening suitable for housing a locking element for locking said first blade in a direction of extraction of the blades from the housing seat and the blades comprise a respective shaped portion arranged one after the other along the direction of extraction of the blades.

21 Claims, 3 Drawing Sheets

(56) References Cited

U.S. PATENT DOCUMENTS

| | | | | | |
|---|---|---|---|---|---|
| 3,351,116 | A | * | 11/1967 | Madsen | F16B 39/24 |
| | | | | | 411/102 |
| 4,906,150 | A | * | 3/1990 | Bennett | F16B 39/10 |
| | | | | | 411/119 |
| 5,429,465 | A | * | 7/1995 | Puskas | F16B 39/101 |
| | | | | | 411/87 |
| 5,711,644 | A | * | 1/1998 | Regnath | F16B 39/10 |
| | | | | | 411/119 |
| D691,034 | S | * | 10/2013 | Field | D8/399 |
| 2015/0271982 | A1 | * | 10/2015 | Bos | A01B 33/142 |
| | | | | | 172/21 |

FOREIGN PATENT DOCUMENTS

| | | | | | |
|---|---|---|---|---|---|
| EP | 2591649 | A1 | | 5/2013 | |
| EP | 2719269 | A1 | | 4/2014 | |
| EP | 2727447 | A1 | | 5/2014 | |
| FR | 1224030 | A | * | 6/1960 | A01B 33/021 |
| FR | 2330295 | A1 | | 6/1977 | |
| FR | 3040855 | A1 | * | 3/2017 | A01B 33/142 |
| GB | 2117614 | A | | 10/1983 | |
| WO | WO-2004028236 | A2 | * | 4/2004 | A01B 33/142 |
| WO | WO-2016132305 | A1 | * | 8/2016 | A01B 33/142 |

\* cited by examiner

CUTTER UNIT FOR A ROTARY TILLING MACHINE

The present invention relates to a blades assembly and a cutter unit for a rotary tilling machine of the type having the characteristics mentioned in the preamble of claim 1.

Rotary tilling machines are machines for tilling soil that comprise a rotor provided with a plurality of knives, grouped together in cutter units, which act on the ground for breaking up turf or, in general, for preparing the same.

Typically, the blades are fixed to the rotor by means of a pair of screws that prevent the blade from rotating with respect to the rotor, as described for example in French patent FR 2330295.

Depending on their size, these machines may comprise a relatively large number of blades whose fixing to the rotor, either at the assembly stage or following replacement for maintenance purposes, can be rather costly in terms of time.

To overcome this disadvantage, various solutions have been proposed for coupling the blades to the rotor.

For example, European patent application EP 2719269 describes a cutter unit for a tiller machine wherein the blades, grouped together in units of two, are connected to a flange of the rotor by means of a pair of plates provided with pins.

The two blades are inserted on the pins and then the plates are fixed to the flange by means of a bolted connection. This makes it possible to reduce the number of screws to be secured, but the fitting of the plates on to the relative pins is not always easy.

A further example is described in EP 2591649, which relates to a cutter unit comprising pairs of blades of symmetrical shape that are locked by means of a common locking element.

However, the symmetrical shape of the two blades makes their positioning rather unstable in the absence of a locking element, since in this case the two blades are free to move in the direction of extraction.

More generally, this and other similar solutions require a degree of complexity in the phases of assembly and disassembly. They also require the creation of a series of special components, which inevitably entail an increase in the production costs of the machine.

In addition, many of these blade fixing systems include large numbers of small or easily deformable parts and are therefore ill-suited for use in fields and other working environments typical of these machines.

The technical problem underlying the present invention is therefore that of providing a rotary tilling machine that is structurally and functionally designed to overcome all the disadvantages mentioned with reference to the cited prior art.

This problem is solved by the blades assembly according to claim 1 and the cutter unit for a rotary tilling machine according to claim 7.

Preferred features of the invention are defined in the dependent claims.

The present invention makes it possible to obtain an effective fixing of the blades of a cutter unit of a tilling machine with the use of a reduced number of fixing elements, for example screws or bolts.

Moreover, it does not require the creation of complex components, keeping costs comparable or even lower with respect to the known systems.

In addition, according to preferred aspects, the present invention is particularly suitable for use in fields or similar working environments.

The characteristics and further advantages of the invention will be made clearer by the following detailed description of a preferred but non-exclusive embodiment, illustrated by way of non-limitative example with reference to the accompanying drawings, in which.

Figure 1:
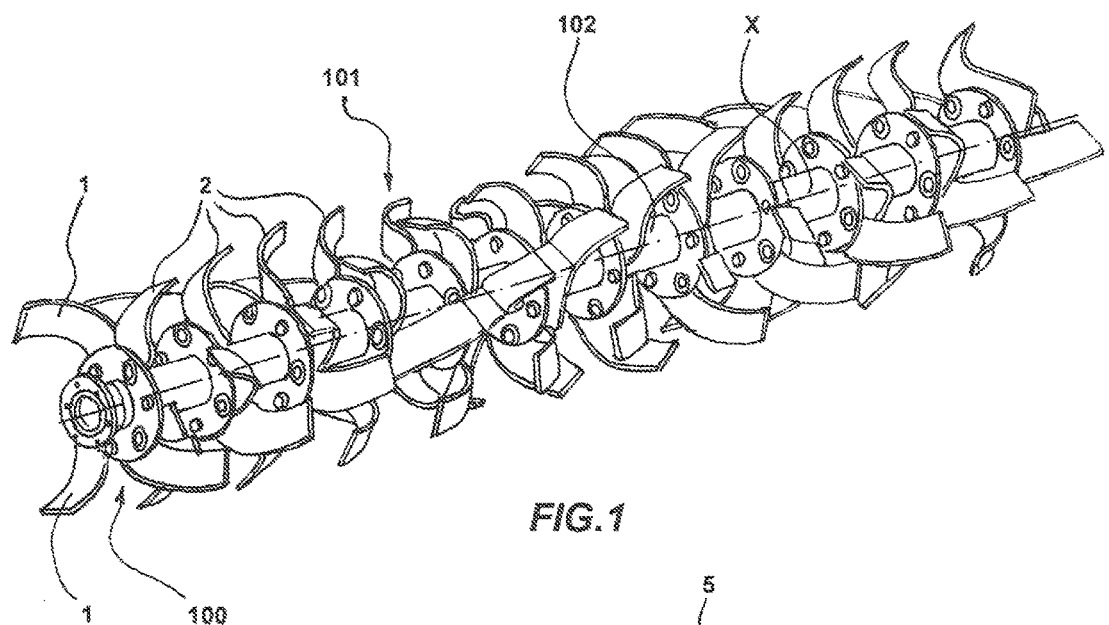
FIGS. 1 and 1A are respectively a perspective view and a related detail of a rotor for a rotary tilling machine comprising a plurality of cutter units according to the present invention.
Figure 1A:
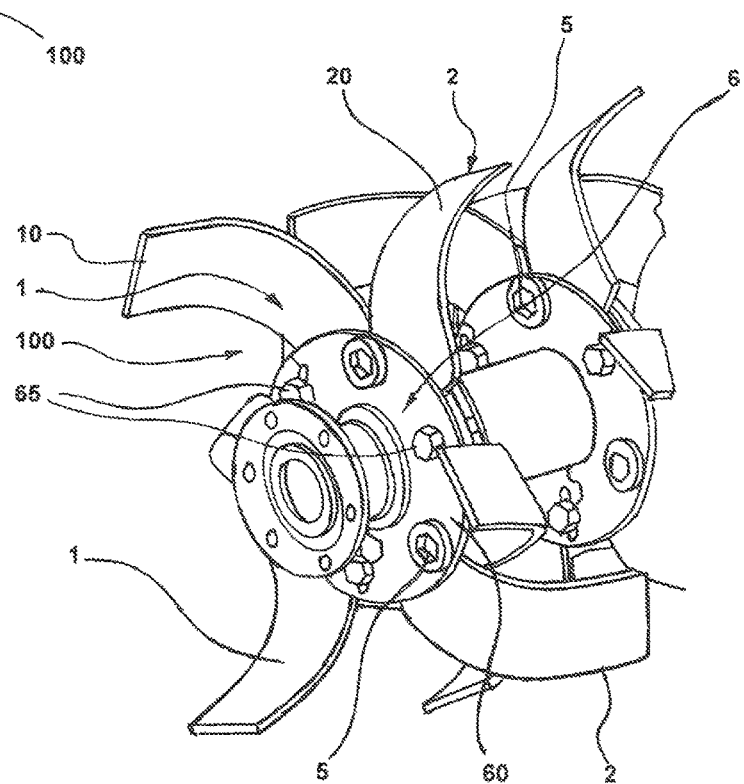

With reference initially to FIGS. 1 and 1A, a cutter unit for a rotary tilling machine is indicated as a whole with the reference number 100.

The cutter unit 100 is part of a rotor 101 of the tilling machine capable of rotating about an axis of rotation X in order to work the land in a manner that is known per se. To this end, the cutter unit 3 is connected to a shaft 102 supported rotatably in the tilling machine.

Figure 2:
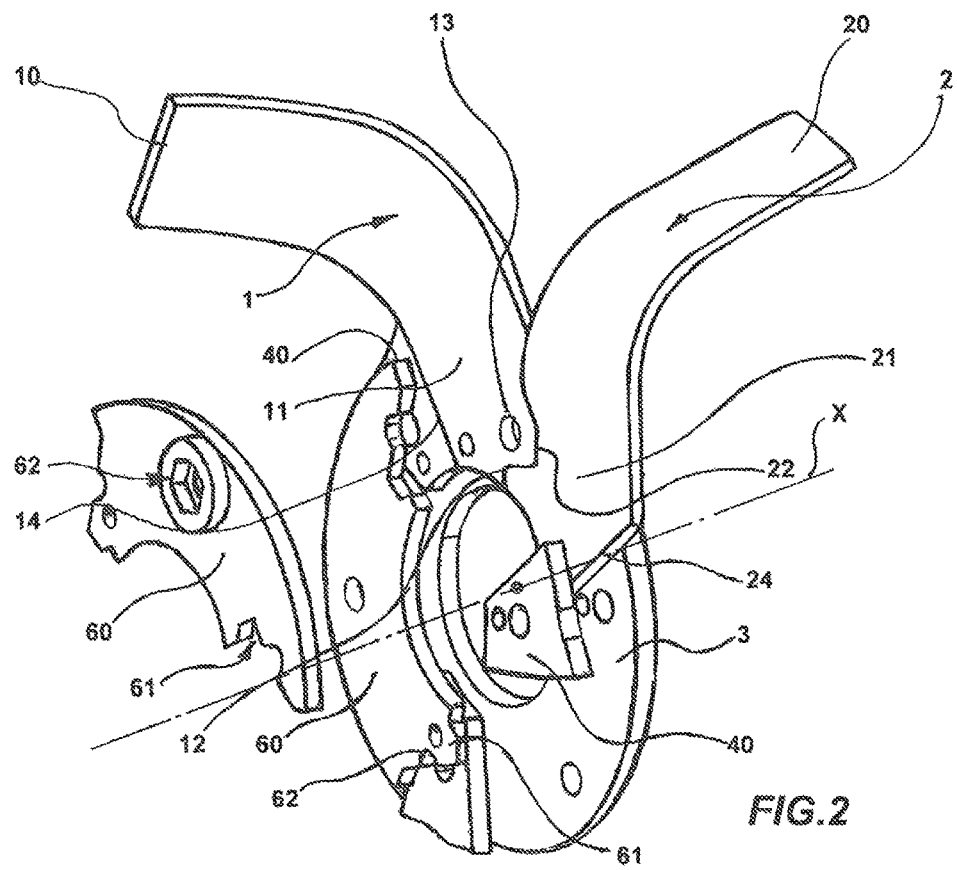
FIG. 2 is a partially exploded perspective view of a cutter unit according to the present invention from which some components have been removed for greater clarity of illustration.

With reference now also to FIG. 2, each cutter unit 100 comprises a coupling flange 3 connected or connectable to a rotor 101 of the tilling machine.

For example, the flange 3 may be fixed to the shaft 102 by means of welding, or otherwise connected.

Preferably, the flange 3 has the form of a circle, concentric with respect to the X axis, and extends radially with respect to the shaft 102.

Each cutter unit 100 comprises a plurality of blades arranged in pairs. Each pair of blades comprises a first blade 1 and a second blade 2, which comprise respective operating portions 10, 20, preferably facing in opposite directions with respect to the axis of rotation X.

The invention will be described below with reference to one pair of blades, on the understanding that the same principles can also be applied to the other pairs. Furthermore, although in the present embodiment there are three pairs of blades for each cutter unit 100, it will be understood that a different number of blades may also be present.

Figure 3:
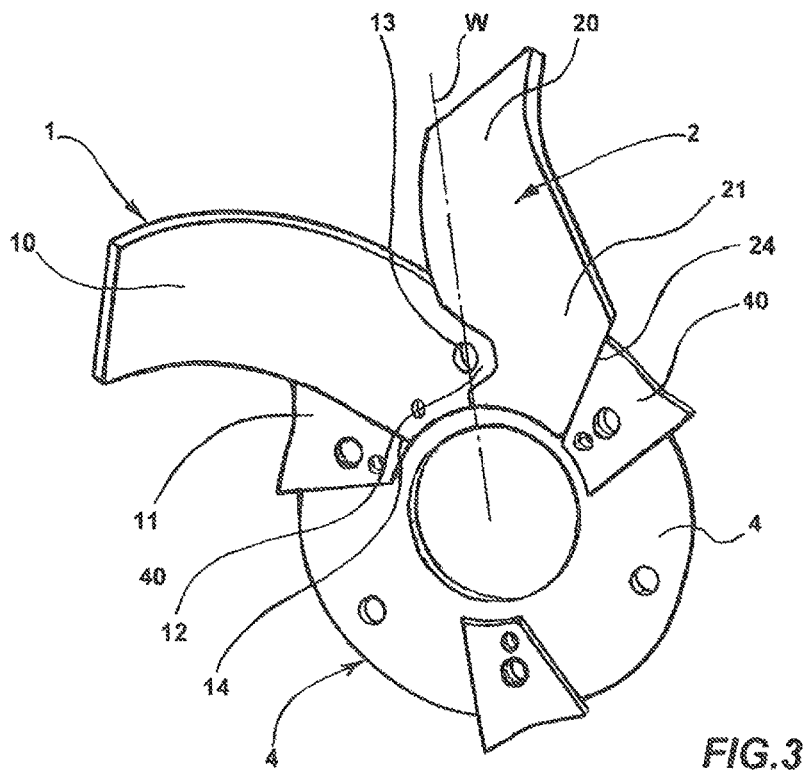
FIG. 3 is a front view of the cutter unit of FIG. 2 with further components removed.

In addition to the operating portion 10, 20, the blades also comprise a respective coupling portion 11, 21, shown in FIGS. 2 and 3.

The coupling portions 11, 21 are intended to be inserted into a housing seat 4 formed on said cutter unit.

In the present embodiment, the operating portions 10, 20 and the coupling portions 11, 21 are formed by bending a metal plate having an elongated form.

According to a preferred embodiment, the housing seat 4 is defined by a pair of inserts 40 fixed or fixable to said coupling flange 3 in positions spaced along the perimeter of said coupling flange.

The two inserts 40 define respectively side walls of the seat 4 and, preferably, when the blades are inserted into the seat, respective mating edges 14, 24 of each blade mate with a respective wall of the seat 4. This makes it possible to constrain the blades 1, 2 along the tangential direction, at least in one direction. To this end, preferably the coupling portions 11, 21 of the first and second blades 1, 2, when placed alongside each other, present a form complementary to the housing seat 4. Preferably, this form is represented by a circular sector.

However, as will be illustrated more clearly below, it may also be provided that only one of the blades mates with a side wall of the seat 4.

The other walls of the seat 4 are defined by the coupling flange and by a counter-flange 6 which faces said coupling flange 3 and is distanced from the same by the inserts 40.

Preferably, the counter-flange 6 is divided into sectors 60 comprising shaped extremities 61 of reciprocally complementary form. For example, in the present embodiment, three inserts 4 are present, thus defining three seats for a total of 6 pairs of blades 1, 2. There are also three sectors 60, and the shaped extremities 61 are arranged at the level of each insert 40.

In this way, it is possible to arrange individually the sectors 60, thus also forming individually the seats 4.

In any event, it is understood that a different number of inserts and/or sectors may be provided.

According to a preferred embodiment, each shaped extremity 61 also has a semi-opening 62 intended to form a hole for the passage of a screw or other similar fixing element 50, when coupled to the semi-opening of the shaped extremity 61 of complementary form. In this way, a single fixing element 65 locks two sectors 60 of the counter-flange 6.

Again with reference to FIGS. 2 and 3, the housing seat 4 thus defined extends in a radial direction along the coupling flange 3 and towards the outside of the same.

It is therefore evident that this form of the seat is particularly suitable for the insertion of the blades.

It is also noted that in the present embodiment, in which the blades are made from folded metal plates, the coupling portions 11, 21 extend radially with respect to the axis of rotation X of the rotor when inserted into the seats, in a plane perpendicular to said axis X. The operating portions 10, 20, on the other hand, are inclined with respect to the coupling portions 11, 21, one in one direction and the other in the opposite direction with respect to the axis of rotation X.

In order to lock the blades in the seat 4, the coupling portion 11 of the first blade 1 comprises an opening 13 suitable for housing a locking element 5.

Said locking element 5, for example created by means of a screw or bolt, makes it possible to lock the first blade 1 with respect to the coupling flange 3 at least along a direction of extraction W of the blades 1, 2 of the housing seat 4.

In one embodiment, the coupling portions 11, 21 of the blades 1, 2 have an elongated form and the direction of extraction W is defined by the direction of longitudinal extension of said coupling portions 11, 21.

According to a preferred embodiment, the locking is obtained by providing corresponding openings on the flange 3 and the counter-flange 6 and by causing the locking element to pass through said openings. However, it is evident that different solutions may also be provided for creating said locking of the blades 1, 2.

So that a single locking element 5 can act on both blades 1, 2, said blades also comprise a respective shaped portion 12, 22 which, as will become evident, helps to solidly unite the two coupling portions 11, 21 of the blades.

Preferably, the shaped portion of the first blade 1 is defined by a lateral extension, while the shaped portion of the second blade 2 defines a recessed area within which said extension engages.

In this way, when the two coupling portions 11, 21 are in contact at the level of the shaped portions, these will be solidly united in the movements along the direction of extraction W of the housing seat 4. It is noted that in the present embodiment, the extension is included between two edges of the recess, thus making it possible to solidly unite the blades both in the direction of extraction and in the opposite direction of insertion.

More generally, in order also to prevent the extraction of the second blade, while using a single locking element on the first blade, the shaped portions 12, 22 are arranged one after the other along the direction of extraction W. Preferably, the shaped portion 11 of the first blade 1 is arranged externally along the direction W with respect to the shaped portion 21 of the second blade 2.

It is noted that in the present embodiment, the direction W corresponds essentially to a radial direction, but may also be inclined with respect to the same. It should also be observed that the operating portions 10, 20 are arranged one after the other along the direction of extraction W in relation to the respective coupling portions 11, 21.

As mentioned previously, in order to hold the second blade in a tangential direction, and thus to ensure that the two shaped portions 12, 22 remain adjacent, the mating edge 24 of the second blade 2 is created in such a way as to mate with the side of the housing seat 4 when the blades are inserted into the same.

In addition, preferably the mating edge 14 of the other blade 1 mates with a side of the housing seat 4, in such a way that it can also serve as a guide during the action of inserting the blades.

In one embodiment, the mating edge 14 of the first blade 1 and/or the mating edge 24 of the second blade 2 extends in a straight line. Preferably, the respective side/s of the housing seat 4 has/have a complementary form. In this way, it is possible to have a simple insertion of the blades, and at the same time a stable contact between the mating edge and the side of the housing seat.

According to a preferred embodiment, the opening 13 is created at the level of the shaped portion 11 of the first blade 1 and is preferably created in the form of a through hole. In the present embodiment, wherein the coupling portion 11 is formed from a plate, the through hole has a normal axis with respect to the plane defined by said plate.

According to a preferred embodiment, the locking element 5 comprises a screw 50 that can be inserted, as well as into the opening 13, into a hole 35 created on said coupling flange 3.

Figure 4A:
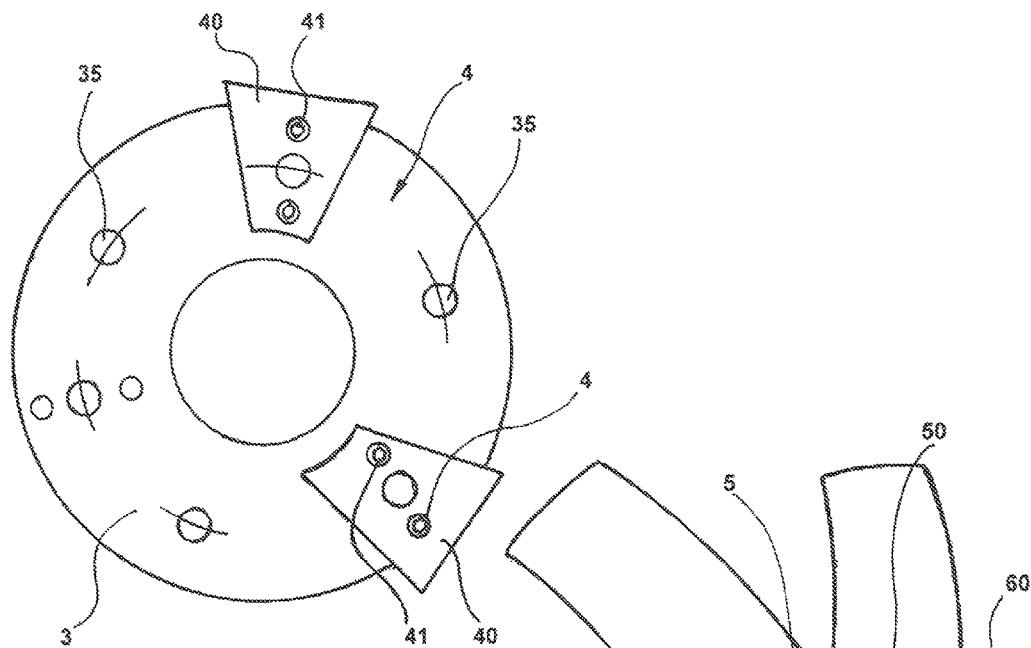
FIGS. 4A to 4C are front views illustrating the cutter unit according to the present invention in various fitting configurations.
Figure 4C:
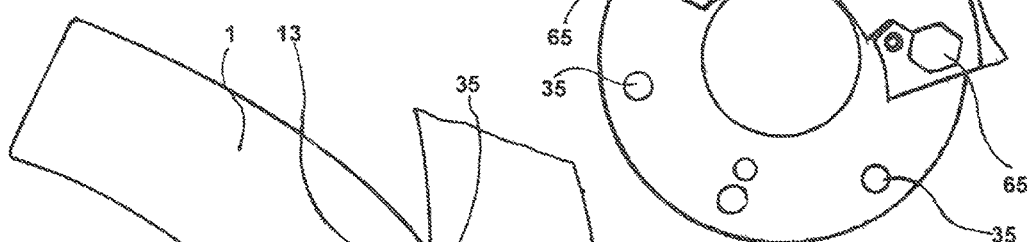
Figure 4B:
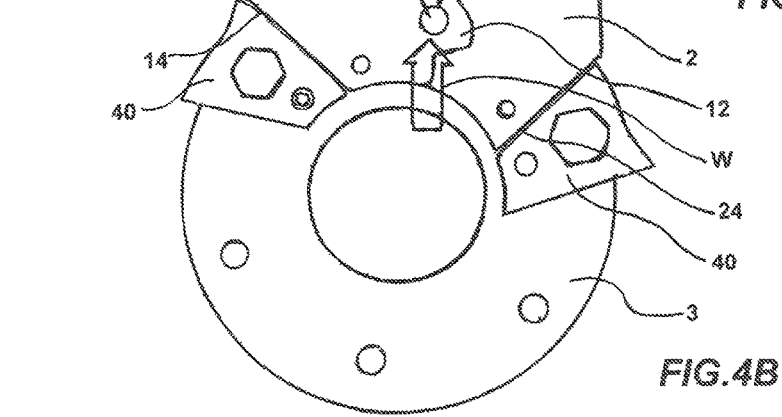

As can be seen in FIG. 4B, when the blades are inserted into the seat 4, the opening 13 on the first blade 1 coincides with the hole 35 on the flange, thus allowing the insertion of the screw 50 and the consequent locking of the blades.

Preferably, the screw 50 comprises a shaped head 51 and the counter-flange comprises a seat 62, illustrated in FIG. 2, within which said head 51 may be held in such a way as to prevent the rotation of said screw 50. This makes it possible to further simplify and speed up the operations of locking the blades.

The fixing of the blades 1, 2, and generally the arrangement of the cutter unit 100, will now be illustrated with reference to FIGS. 4A, 4B and 4C.

Initially, the inserts 40 are placed on the flange 3 in such a way as to define the housing seats 4.

Preferably, the inserts 40 are fixed by means of one or more plugs 41, insertable into respective holes created on the flange 3, which allow them to be easily and precisely positioned.

In addition, it should be noted that according to a preferred embodiment, the inserts 40 have a greater radial extension with respect to the flange 3, in such a way as to offer a greater surface of contact with the blades 1, 2. Once the inserts 40 have been positioned, the sectors 60 of the counter-flange 6 are placed on top of the same, thus defining the housing seats 4 as illustrated previously.

Preferably, the sectors 60 also have a hole for the insertion of the plugs 41. The sectors are then locked in position by means of the screws 65 which engage in the respective nuts, not shown in the drawing.

The blades 1, 2 can then be placed in the housing seat 4 and locked using the screw 50.

The invention thus solves the proposed problem, while simultaneously providing numerous advantages. In particular, the locking and unlocking of two blades takes place using a single locking element, for example created by means of a screw. However, it is evident that the same advantages could also be obtained by using different locking elements, such as for example pins provided with plugs.

In addition, the cutter unit according to the present invention requires only minimal modifications with respect to the known solutions and does not require any components that are delicate or difficult to produce.

The use of a counter-flange divided into sectors is also particularly useful, since it makes it possible to use the play offered by the coupling between the various sectors to compensate for any dimensional errors.

The invention claimed is:

1. A blades assembly for a cutter unit of a rotary tiller machine, comprising a first blade and a second blade, said first and second blades comprising a respective working portion and a respective coupling portion, said coupling portions being insertable into a housing seat of the cutter unit, wherein the coupling portion of the first blade comprises an opening capable of accommodating a locking element for locking said first blade on the cutter unit in at least one direction of extraction of said blades from said housing seat, said direction of extraction being defined by the direction of longitudinal development of said coupling portions, said blades comprising a respective shaped portion, said shaped portions being connectable to one another in such a way that said shaped portions are arranged one after the other along the direction of extraction of the blades, wherein the shaped portion of the first blade is defined by a lateral extension and the shaped portion of the second blade is defined by a recessed area within which the extension engages, the opening being defined by a through hole formed in the lateral extension.

2. A blades assembly according to claim 1, wherein the shaped portion of said first blade is arranged externally along the direction of extraction with respect to the shaped portion of said second blade.

3. A blades assembly according to claim 1, wherein the coupling portions of said first and second blades, when placed alongside each other, present a form with an essentially circular sector.

4. A blades assembly according to claim 1, wherein said opening is created by a through hole.

5. A cutter unit for a rotary tiller machine comprising a coupling flange connected or connectable to a rotor of the tiller machine, a first blade and a second blade, said first and second blades comprising a respective working portion and a respective coupling portion, said cutter unit further comprising a housing seat for said blades, which extends in a radial direction on said coupling flange and towards the outside of the same, wherein the coupling portion of the first blade comprises an opening capable of accommodating a locking element for the locking of said first blade with respect to said coupling flange in at least one direction of extraction of said blades from said housing seat, said direction of extraction being essentially parallel to said radial direction, said blades comprising a respective shaped portion, said shaped portions being arranged one after the other along the direction of extraction, wherein the shaped portion of the first blade is defined by a lateral extension and the shaped portion of the second blade is defined by a recessed area within which the extension engages, the opening being defined by a through hole formed in the lateral extension.

6. A cutter unit according to claim 5, wherein the shaped portion of said first blade is arranged externally along said direction of extraction with respect to the shaped portion of said second blade.

7. A cutter unit according to claim 5, wherein said seat is defined by a pair of inserts fixed to said coupling flange in positions spaced along the perimeter of said coupling flange and by a counter-flange which faces said coupling flange, distanced from the same by said inserts.

8. A cutter unit according to claim 7, wherein said counter-flange is divided into sectors comprising shaped extremities of reciprocally complementary shape.

9. A cutter unit according to claim 5, wherein said locking element comprises a screw insertable into a hole created on said coupling flange.

10. A cutter unit according to claim 9, wherein said screw comprises a shaped head of said counter-flange or said flange comprising a seat within which said head may be held in such a way as to prevent the rotation of said screw.

11. A cutter unit according to claim 5, wherein said coupling portions comprise respective mating edges opposite said shaped portions and capable of mating with respective sides of said seat.

12. A cutter unit according to claim 11, wherein the mating edge of the first blade and/or the mating edge of the second blade extend in a straight line, said sides of said seat presenting a shape complementary to the respective edge against which they abut.

13. A cutter unit according to claim 5, wherein the coupling portions of said first and second blades, when placed alongside each other, present a shape complementary to said housing seat.

14. A cutter unit for a rotary tiller machine comprising a coupling flange connectable to a rotor of the tiller machine, a plurality of blades assemblies comprising a first blade and a second blade, each of said first and second blades comprising a respective working portion and a respective coupling portion, said cutter unit further comprising a plurality of seats for housing the coupling portion of a respective blade assembly, each seat extending in a radial direction on said coupling flange and towards the outside of the same, wherein the coupling portion of the first blade comprises an opening capable of accommodating a locking element for locking said first blade with respect to said coupling flange in at least one direction of extraction of said blades from said housing seat, said direction of extraction being essentially parallel to said radial direction, said first and second blades comprising a respective shaped portion, said shaped portions being arranged one after the other along the radial direction, wherein each of said seat is defined by a pair of inserts fixed to said coupling flange in positions spaced along the perimeter of said coupling flange and by a counter-flange which faces said coupling flange, wherein the coupling portions of the blades comprise respective mating edges opposite to said shaped portions and capable of mating with respective sides of each insert forming the seat, the mating edge of the first blade and the mating edge of the second blade extend in a straight line, said sides of said seat presenting a shape complementary to the respective edge of the insert against which they abut.

15. A cutter unit according to claim 14, wherein the shaped portion of said first blade is arranged externally along said direction of extraction with respect to the shaped portion of said second blade.

16. A cutter unit according to claim 14, wherein said counter-flange is divided into sectors comprising shaped extremities of reciprocally complementary shape.

17. A cutter unit according to claim 14, wherein said locking element comprises a screw insertable into a hole created on said coupling flange.

18. A cutter unit according to claim 17, wherein said screw comprises a shaped head of said counter-flange or said flange comprising a seat within which said head may be held in such a way as to prevent the rotation of said screw.

19. A cutter unit according to claim 14, wherein said opening is created at the level of the shaped portion of said first blade.

20. A cutter unit according to claim 14, wherein the shaped portion of said first blade is defined by a lateral extension and the shaped portion of said second blade defines a cutaway area within which said extension engages.

21. A cutter unit according to claim 14, wherein the coupling portions of said first and second blades, when placed alongside each other, present a shape complementary to said housing seat.

* * * * *